(12) United States Patent
Posamentier

(10) Patent No.: US 8,206,460 B2
(45) Date of Patent: Jun. 26, 2012

(54) SECURITY SYSTEM

(75) Inventor: Joshua Posamentier, Oakland, CA (US)

(73) Assignee: Intel Corporation, Santa Clara, CA (US)

(*) Notice: Subject to any disclaimer, the term of this patent is extended or adjusted under 35 U.S.C. 154(b) by 1164 days.

(21) Appl. No.: 11/633,787

(22) Filed: Dec. 5, 2006

(65) Prior Publication Data

US 2008/0134299 A1    Jun. 5, 2008

(51) Int. Cl.
*G06F 21/00* (2006.01)
(52) U.S. Cl. .......................................... 726/35
(58) Field of Classification Search .................. None
See application file for complete search history.

(56) References Cited

U.S. PATENT DOCUMENTS

| | | | |
|---|---|---|---|
| 6,643,781 B1 * | 11/2003 | Merriam | 726/35 |
| 7,415,605 B2 * | 8/2008 | LaCous | 713/150 |
| 7,607,015 B2 * | 10/2009 | Fascenda | 713/171 |
| 7,674,298 B1 * | 3/2010 | Cambridge | 726/35 |
| 2002/0108058 A1 * | 8/2002 | Iwamura | 713/201 |
| 2004/0056759 A1 * | 3/2004 | Ungs | 340/5.74 |
| 2004/0192303 A1 * | 9/2004 | Puthenkulam | 455/435.1 |
| 2009/0183241 A1 * | 7/2009 | Anderson | 726/4 |

* cited by examiner

*Primary Examiner* — Minh Dinh
(74) *Attorney, Agent, or Firm* — Forefront IP Lawgroup, PLLC

(57) ABSTRACT

Described herein are one or more implementations of a security system for one or more protected devices. The security system implements an authentication system that enables protected devices. Protected devices are enabled for a particular network, and are disabled when the protected devices leave the network.

12 Claims, 3 Drawing Sheets

SECURITY SYSTEM

BACKGROUND

Protecting objects from theft is a problem for both individuals and businesses. Certain items such as computers, video projectors, printers, and the like are common theft targets due to their high value and portability. Businesses and individuals may attempt to secure items from theft using a mechanical lock and security cable. However, this type of security is easily defeated by cutting the security cable and carrying off the protected item.

Another security measure utilizes security cameras to monitor high-value items. Although the security camera may attempt to capture an image of the person stealing the item, this security approach can be overcome by disabling the security camera or disguising the appearance of the thief.

Current security approaches, including those discussed above, have a common problem: once the item is successfully carried away from the location at which the security system is located, the device functions in a normal manner. For example, if a computer is stolen by cutting a security cable attached to the computer, that computer will function normally and contain the same data after it is activated by the thief at a distant location. This problem encourages the theft of certain items because thieves know that the stolen item will have value due to its ability to continue functioning normally.

BRIEF DESCRIPTION OF THE DRAWINGS

The same reference numbers are utilized in instances in the discussion to reference like structures and components.

DETAILED DESCRIPTION

In the following discussion, exemplary devices are described which may provide and/or utilize techniques to provide security for one or more protected devices. When a protected device is within communication range of a network or a network access point (e.g., a wireless access point, power line communication, LAN connection, or phone line connection) and able to communicate with it, the protected device operates normally. The protected device is by default disabled and can be enabled remotely via the network connection. However, moving the protected device outside the range of the network or network access point eliminates the ability of the user to enable and use the protected device. Stealing such a protected device is therefore discouraged because the stolen device will have little value without being able to enable the device. Exemplary procedures are described which may be employed by the exemplary devices, as well as by other devices without departing from the spirit and scope thereof.

Exemplary Devices

Figure 1:
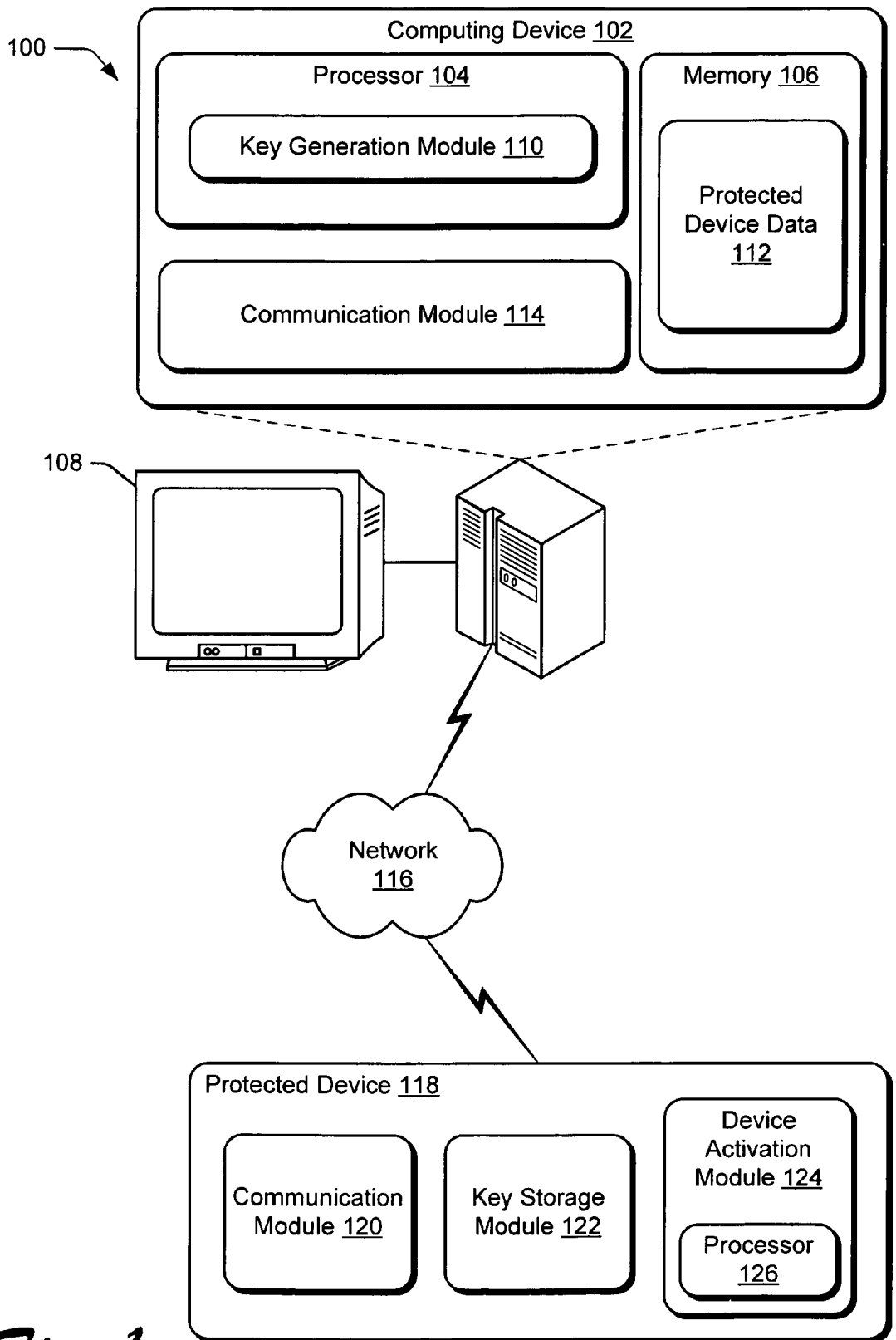
FIG. 1 is an illustration of an example environment that provides a security system for one or more protected devices.

FIG. 1 is an illustration of an example environment 100 that provides a security system for one or more protected devices. Environment 100 includes a computing device 102 that is operable to employ techniques to authenticate one or more protected devices 118 via a data communication network 116. Computing device 102 may be configured in a variety of ways, such as a traditional desktop computer (e.g., a desktop PC), a server, a notebook computer, a personal information appliance, a data communication card, and so on. Thus, computing device 102 may be configured as a "thick" computing device having significant processing and memory resources (e.g., a server) to a "thin" computing device having relatively limited processing and/or memory resources, such as a personal information appliance or a piece of consumer electronic equipment. A wide variety of other configurations are also contemplated.

A single protected device 118 is illustrated in FIG. 1. However, a particular environment 100 may include any number of protected devices 118 coupled to any number of computing devices 102. A protected device includes any device that has the capability to communicate with a data communication network, and is capable of being fully enabled, partially enabled with a time-out, or otherwise modified such that the performance of the protected device is degraded in the absence of an authenticating or enabling communication. This performance degradation may include disabling certain functions, significantly slowing the speed at with the protected device operates, and the like. Example protected devices include computers, printers, copiers, video projectors, displays, telephones, audio/video equipment, medical equipment, electronic testing equipment, and so on. In other examples, the systems and methods discussed herein may be applied to vehicles, large pieces of equipment, and similar objects capable of being enabled or disabled.

Computing device 102, as illustrated in FIG. 1, includes a processor 104, memory 106, and an output device, which is illustrated as a display device 108 in FIG. 1, but may assume a wide variety of other configurations, such as a network interface. Display device 108 is communicatively coupled to processor 104 via a bus, such as a host bus of a graphics memory controller hub. Processor 104 can be configured in a variety of ways, and thus, is not limited by the materials from which it may be formed or the processing mechanisms employed therein. For example, processor 104 may be comprised of semiconductor(s) and/or transistors (e.g., electronic integrated circuits (ICs)), and so on. Additionally, although a single processor 104 is illustrated, processor 104 may be representative of multiple processors that are communicatively coupled to memory 106 through use of a bus.

Memory 106 may be representative of "main memory" of computing device 102, persistent storage (e.g., a hard disk drive), removable computer-readable media (e.g., a digital video disc (DVD)), and other types of computer-readable media. Likewise, although a single memory 106 is illustrated, memory 106 may be representative of multiple memory devices, such as dynamic random access memory (DRAM) and a hard disk drive. A variety of other implementations are also contemplated.

Computing device 102 includes a key generation module 110 that is capable of generating security keys and authenticating data received from one or more protected devices 118. For example, key generation module 110, when executed, generates one or more security keys to be distributed to one or more protected devices 118. In another example, key generation module 110, when executed, authenticates device identity data received from one or more protected devices 118. These keys may be centrally managed and distributed as part of a corporate- or campus-wide public key infrastructure.

Various protected device data 112 is maintained in memory 106. This protected device data 112 is used, for example, by key generation module 110 to generate security keys or authenticate data received from a protected device 118. Protected device data 112 may include information associated with one or more protected devices 118, one or more security keys, and the like.

Computing device 102 also includes a communication module 114, which allows computing device 102 to communicate with any number of devices via any number of communication links and/or communication networks. In the example of FIG. 1, communication module 114 communicates with protected device 118 via data communication network 116. Communication module 114 may use any communication medium and any communication protocol to communicate via network 116. Examples of data communication network 116 include wired and wireless local area networks (LANs and WLANs), wireless wide area networks (WWANs), and other networks or communications links that allow multiple devices to communicate with one another. Data communication network 116 may be a wired network, a wireless network, or a combination of both wired and wireless networks. In alternate embodiments, network 116 may be replaced with (or complemented with) one or more data links, such as a universal serial bus (USB) communication link, a radio frequency identification (RFID) communication link, or an infrared (IR) communication link.

Protected device 118 includes a communication module 120, a key storage module 122, and a device activation module 124. Communication module 120 allows protected device 118 to communicate with other devices, such as an authentication system or a key distribution system. In one embodiment, communication module 120 communicates with network 116 via a wireless communication link. In other embodiments, communication module 120 communicates with other devices via a wired, wireless, or combination of wired and wireless communication links.

Communication module 120 may be added to devices that do not otherwise utilize a network communication link. For example, a particular video projector may not contain a network interface. However, to protect the device in the manner discussed herein, an inexpensive communication module 120 is embedded in the device. This communication module 120 is coupled to key storage module 122 and device activation module 124 to activate the video projector using the techniques described herein. Authentication and enablement of devices may also be time limited such that authentication must occur periodically in order to maintain operation of the device.

Key storage module 122 stores one or more security keys used to authenticate protected device 118. Device activation module 124 performs various functions to determine whether protected device 118 should remain active or should be deactivated or disabled. Device activation module 124 includes a processor 126 that performs various functions related to the authentication, activation, and disabling of protected device 118, as discussed herein. Device activation module 124 may periodically verify that protected device 118 can access computing device 102 via network 116. If protected device 118 cannot access computing device 102 via network 116, device activation module 124 may deactivate or disable protected device 118. Protected device 118 is deactivated or disabled based on an assumption that protected device 118 has been improperly moved outside the communication range of network 116 or outside the communication range of an associated network access point.

In one embodiment of protected device 118, key storage module 122 and device activation module 124 are located in a trusted portion of the protected device's hardware that is not subject to any consumer-level reset functionality. For example, key storage module 122 and device activation module 124 can be part of a Trusted Platform Module (TPM) distributed by Intel Corporation of Santa Clara, Calif. Such configuration reduces the likelihood that a user will tamper with key storage module 122 or device activation module 124 to defeat the security provided to protected device 118.

In another embodiment, communication module 120, key storage module 122, and device activation module 124 are contained on a separate component that can be physically and electrically coupled to protected device 118. For example, the separate component may be coupled to protected device 118 using a universal serial bus (USB) connection or other interface. When the separate component is coupled to protected device 118 and is within range of a network or a network access point associated with protected device 118, the protected device operates normally. However, removal of the separate component or relocating protected device 118 outside the range of the network or network access point prevents the enabling of protected device 118.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs such as the processor 104 of FIG. 1). The program code can be stored in one or more computer-readable memory devices, e.g., memory 106 of FIG. 1. The features of the techniques to provide security described herein are platform-independent, meaning that the techniques may be implemented on a variety of commercial computing platforms having a variety of processors.

Exemplary Procedures

The following discussion describes security techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
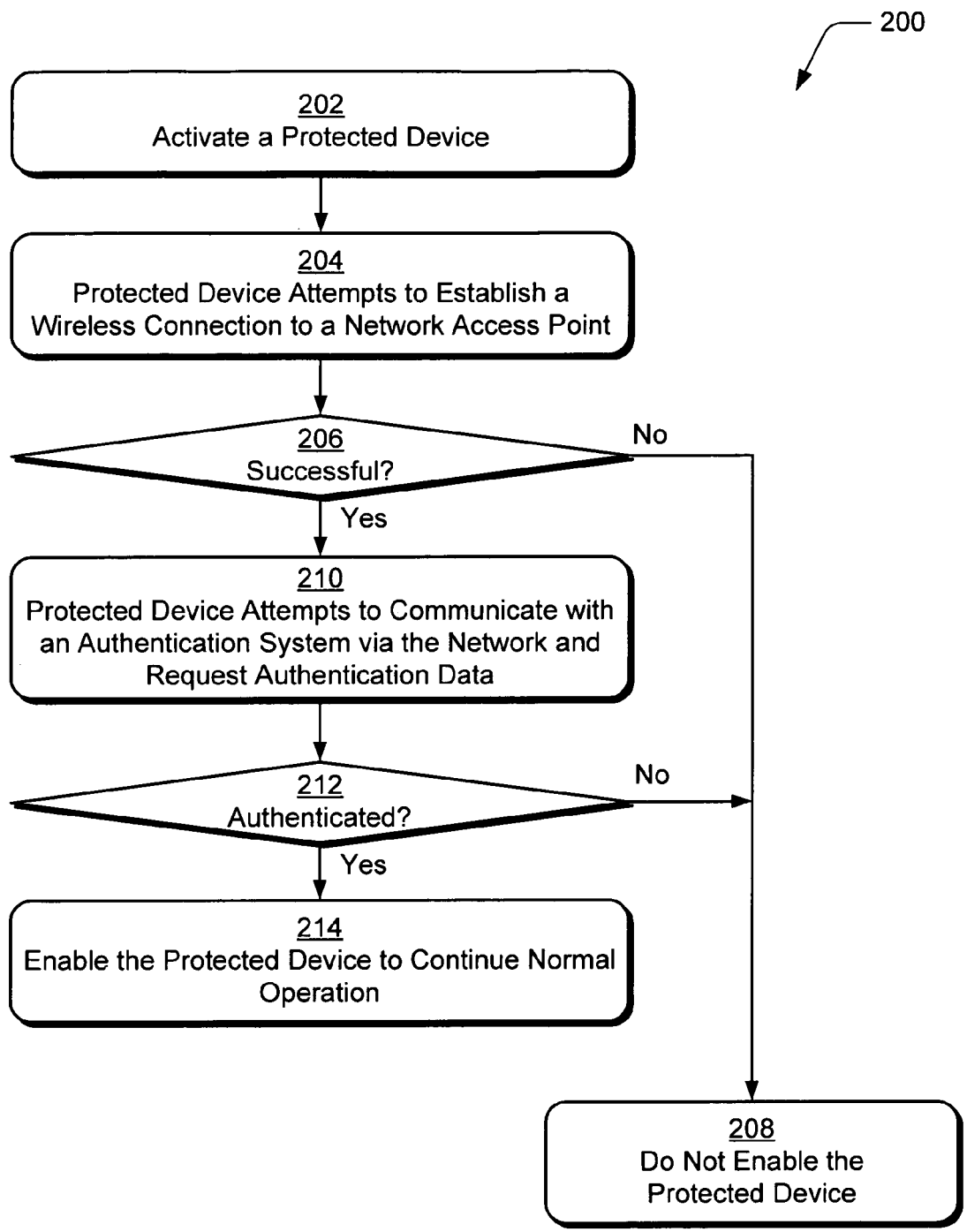
FIG. 2 is a flow diagram depicting an example procedure for activating a device that is protected by a security system.

FIG. 2 is a flow diagram depicting an example procedure 200 for activating a device that is protected by a security system, such as protected device 118 shown in FIG. 1. In this example, the protected device has already "registered" with an authentication system. The authentication system contains information about the protected device and has the capability to authenticate the identity of the protected device or the user of the protected device. In the example of FIG. 2, the protected device uses a wireless communication module to communicate with a data communication network. In alternate embodiments, a wired communication module (or any other type of communication module) can be used to communicate with a data communication network or other data communication environment.

Initially, a protected device is activated (block 202), for example, in response to receiving a user request to activate the protected device. Device activation may include powering-up the device, resetting the device, or otherwise initializing the device for operation. As part of the activation process, the protected device attempts to establish a wireless connection to a network access point (block 204), for example by accessing a wireless access point associated with the network. If the protected device cannot establish a wireless connection with the network access point, the procedure branches from block 206 to block 208, which does not enable (or partially enables)

the protected device. For example, the protected device may be powered down at block 208 or otherwise prevented from being enabled. In this situation, the protected device may be referred to as a non-enabled device. The protected device is not enabled in this situation because there is a likelihood that the protected device has been stolen (e.g., moved to a location that is not within range of a network access point coupled to the network). Thus, the protected device has little value when taken from the area in which the protected device can access the network, because the protected device will not function properly. In alternate embodiments, procedure 200 may require two or more successive failures to establish a wireless connection to the network before preventing the enabling of the protected device.

A failure to enable the protected device (or "disabling" the protected device) does not physically damage the device or otherwise affect the ability of the protected device to operate properly in the future. Thus, if the protected device is not enabled because the network (or network access point) was unavailable for a period of time, the protected device can be activated again when the network or network access point is operating properly. When this occurs, the protected device can be activated because the protected device can successfully establish a connection to the network. Even though the protected device was not enabled during a previous network access attempt, the protected device will now operate normally with no loss of functionality due to the previous failure to enable the protected device.

Referring again to FIG. 2, if the protected device successfully establishes a wireless connection with the network access point, the protected device attempts to communicate with an authentication system via the network (block 210). Additionally, the protected device requests authentication data from the authentication system. This request for authentication data may include a security key or other data identifying the protected device or the user of the protected device. In particular embodiments, a public-key encryption system is used to authenticate the protected device. However, any type of encryption and/or authentication system may be used to authenticate the protected device.

If the protected device cannot be authenticated by the authentication system, the procedure branches from block 212 to block 208, which does not enable (or partially enables) the protected device. The protected device is not enabled due to the likelihood that the protected device has been stolen or otherwise tampered with such that the authentication system cannot authenticate the identity of the protected device or user thereof. In alternate embodiments, procedure 200 may require two or more successive authentication failures over a period of time before preventing the enabling of the protected device. Some embodiments attempt to activate the non-enabled device a particular time period (e.g., 10 minutes) after the device has been prevented from being enabled. These embodiments consider the possibility that the network or network access point may have been unavailable or malfunctioning the first time the protected device was activated.

If the protected device is authenticated by the authentication system, procedure 200 enables the protected device to continue normal operation (block 214). In this situation, the protected device is within range of a network access point and is authenticated by an authentication system accessible via the network. This indicates that the protected device is still located in the proper building, campus, or other geographic area, and is not likely to have been stolen.

In particular embodiments, each protected device 118 is associated with a particular network access point. In other embodiments, each protected device 118 is associated with a particular network (e.g., a corporate LAN).

Figure 3:
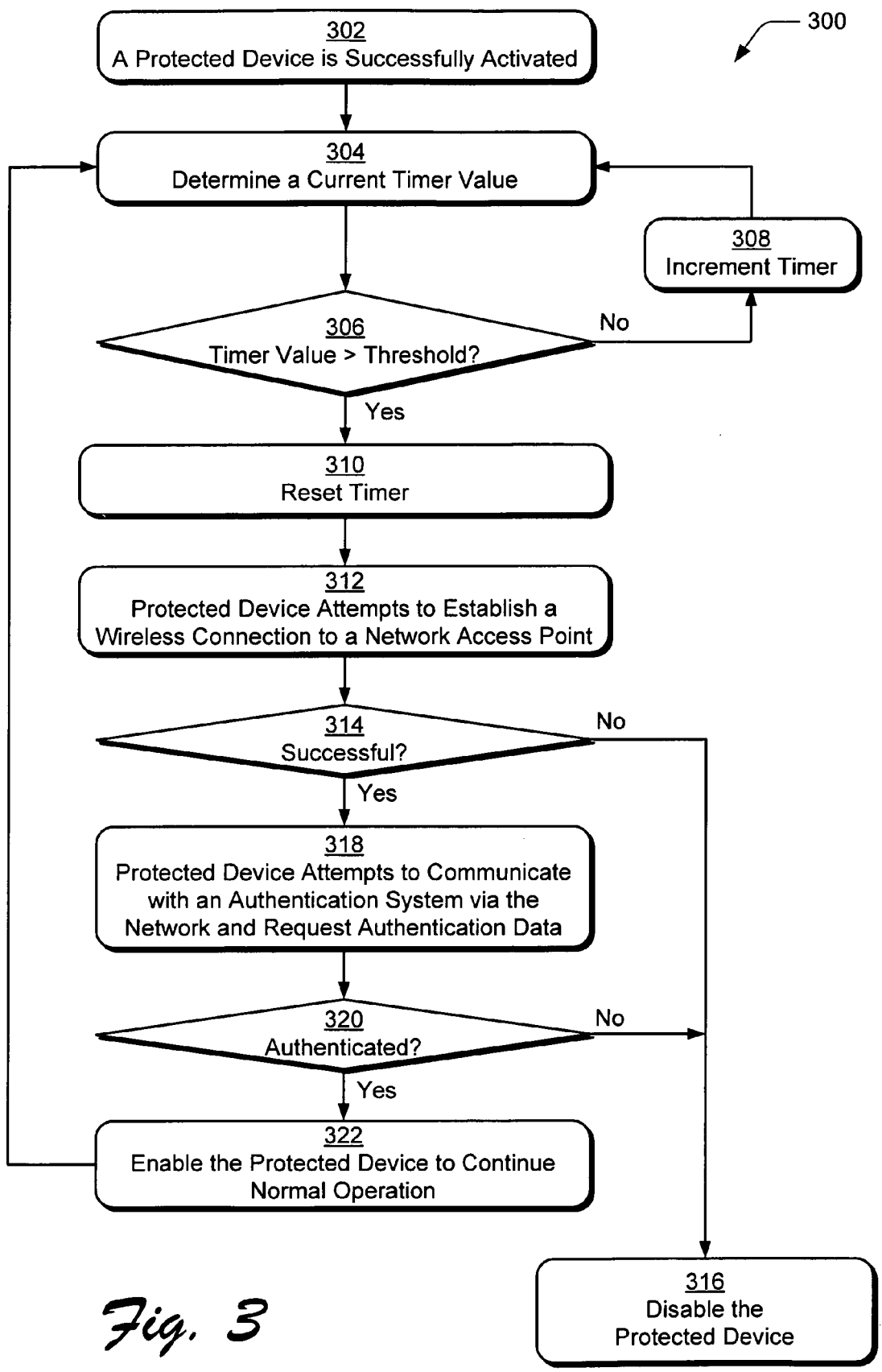
FIG. 3 is a flow diagram depicting an example procedure for operating a device that is protected by a security system.

FIG. 3 is a flow diagram depicting an example procedure 300 for operating a device that is protected by a security system. Initially, a protected device is activated (block 302), for example, using procedure 200 discussed above. Procedure 300 then determines a current timer value (block 304), which is initially set to zero. The timer value is compared to a threshold value (block 306). The threshold value determines the frequency with which the procedure verifies that the protected device is still in its proper location and has not been stolen or otherwise moved to an improper location. If the timer value does not exceed the threshold value, the timer is incremented (block 308), and the procedure returns to block 304. In a particular embodiment, the threshold value is approximately 10 minutes.

If the timer value exceeds the threshold value, procedure 300 branches from block 306 to block 310, which resets the timer value to zero. Next, the protected device attempts to establish a wireless connection to a network access point (block 312). If the protected device cannot establish a wireless connection with the network access point, the procedure branches from block 314 to block 316, which disables (or partially disables) the protected device. The protected device is disabled in this situation because there is a likelihood that the protected device has been stolen (e.g., moved to a location that is not within range of a network access point coupled to the network). In alternate embodiments, procedure 300 may require multiple successive failures to establish a wireless connection to the network before disabling the protected device. For example, a particular embodiment requires six successive failures (with ten minutes between each pair of successive failures) before the protected device is disabled. This embodiment takes into consideration possible network errors or other network communication problems that would otherwise incorrectly disable the protected device.

If the protected device successfully establishes a wireless connection with the network access point, the protected device attempts to communicate with an authentication system via the network (block 318). Additionally, the protected device requests authentication data from the authentication system. This request for authentication data may include a security key or other data identifying the protected device or the user of the protected device. If the protected device cannot be authenticated by the authentication system, the procedure branches from block 320 to block 316, which disables (or partially disables) the protected device. The protected device is disabled due to the likelihood that the protected device has been stolen or otherwise tampered with such that the authentication system cannot authenticate the identity of the protected device. In alternate embodiments, procedure 300 may require two or more successive authentication failures before disabling the protected device.

If the protected device is authenticated by the authentication system, procedure 300 enables the protected device to continue normal operation (block 322). In this situation, the protected device is within range of a network access point and is authenticated by an authentication system accessible via the network. This indicates that the protected device is still located in the proper building, campus, or other geographic area, and is not likely to have been stolen. Procedure 300 then returns to block 304 to await the next time at which the protected device is verified to be in its proper location.

Thus, if a protected device cannot access a particular network (such as a LAN associated with the building in which the protected device should be located) the protected device is disabled (or not enabled) due to the likelihood that the protected device has been stolen. The area in which the protected device should be located may include a portion of a building, an entire building, multiple buildings (e.g., a business or education campus), a town, or other geographic area. Announcing that such a security system is in operation will reduce the likelihood that these protected devices are stolen because the protected devices will not function and will have little value after they are removed from their protected building or geographic area.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a device, the method comprising:
    attempting to establish a connection between the device and a network access point;
    determining whether the device successfully established a connection with the network access point;
    disabling the device if the device does not successfully establish a connection with the network access point;
    requesting, over the connection, authentication from an authentication system using a security key stored in a security key module; and
    disabling the device if the device is not successfully authenticated by the authentication system.

2. A method as described in claim 1, further comprising enabling the device if the device successfully establishes a connection with the network access point.

3. A method as described in claim 1, wherein the network access point is a wireless access point.

4. A method as described in claim 1, wherein the network access point is a particular network access point associated with the device.

5. A method as described in claim 1, wherein attempting to establish a connection between the device and the network access point occurs during device initialization.

6. One or more non-transitory computer-readable media having stored thereon computer executable instructions that, when executed, perform a method comprising:
    receiving a request to activate a device;
    attempting to establish a connection between the device and a particular network access point;
    determining whether a connection was successfully established between the device and the particular network access point;
    disabling the device if a connection was not successfully established between the device and the particular network access point;
    requesting, over the connection, authentication from an authentication system using a security key stored in a security key module; and
    disabling the device if the device is not successfully authenticated by the authentication system.

7. One or more computer-readable media as described in claim 6, wherein the computer executable instructions further enable the device if a connection was successfully established between the device and the particular network.

8. One or more computer-readable media as described in claim 6, wherein attempting to establish a connection between the device and a particular network access point includes multiple attempts to establish a connection between the device and a particular network access point.

9. One or more computer-readable media as described in claim 6, wherein, if a connection was successfully established between the device and the particular network access point, the computer executable instructions further:
    waiting a predetermined time after establishing a connection between the device and the particular network access point;
    attempting to reestablish a connection between the device and the particular network access point; and
    preventing enabling of the device if a connection was not reestablished between the device and the particular network access point.

10. An apparatus comprising:
    one or more processors;
    a communication module coupled to the one or more processors;
    a security key module adapted to store a security key, coupled to the one or more processors; and
    a device activation module coupled to the communication module, wherein the device activation module includes computer executable instructions stored in a non-transitory computer-readable media which when executed by the one or more processors:
        attempt to establish a wireless connection between the apparatus and a network access point;
        authenticate the apparatus with an authentication system coupled to the network access point, using the security key stored in the security key module;
        determine whether a wireless connection was successfully established between the apparatus and the network access point and whether the apparatus was authenticated, and further to disable the apparatus if a wireless connection was not successfully established or the apparatus was not authenticated.

11. An apparatus as described in claim 10, wherein the device activation module includes instructions that when executed by the one or more processors attempts to reactivate a non-enabled apparatus a predetermined time period after the apparatus is prevented from being enabled.

12. An apparatus as described in claim 10, wherein the device activation module includes instructions that when executed by the one or more processors periodically attempt to establish a wireless connection between the apparatus and the network access point, regardless of whether the apparatus was previously prevented from being enabled.

* * * * *